UNITED STATES PATENT OFFICE.

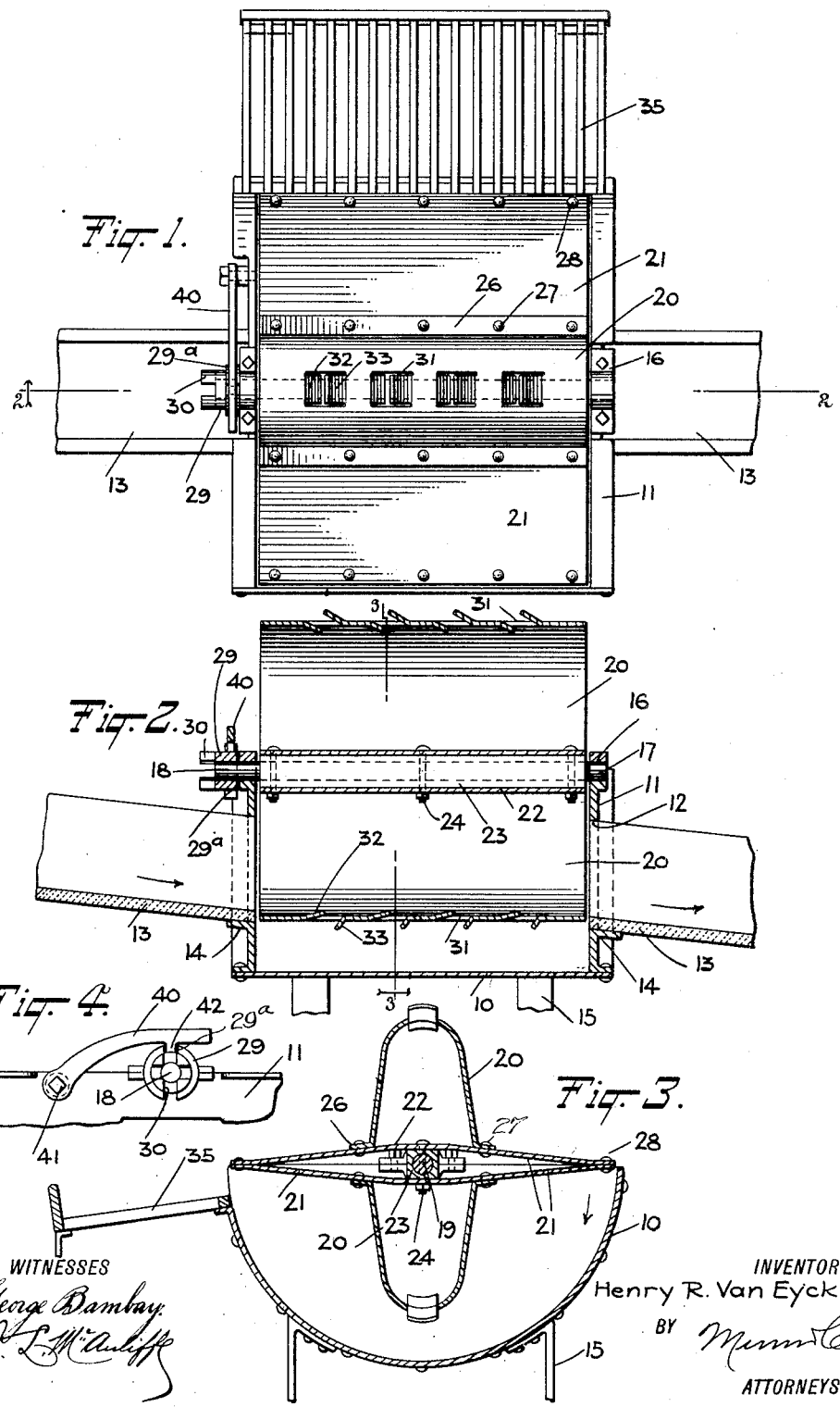

HENRY R. VAN EYCK, OF HOLLAND, MICHIGAN.

STONE-CATCHER FOR FLUMES.

1,037,809.

Specification of Letters Patent.    Patented Sept. 3, 1912.

Application filed May 21, 1912. Serial No. 698,674.

*To all whom it may concern:*

Be it known that I, HENRY R. VAN EYCK, a citizen of the United States, and a resident of Holland, in the county of Ottawa and State of Michigan, have invented a new and Improved Stone-Catcher for Flumes, of which the following is a full, clear, and exact description.

The invention relates particularly to flumes for conveying sugar beets to the mill.

The usual custom with beet sugar mills is to carry the beets from the sheds to the mill by a stream of water running through a flume, and the presence of stones, pieces of iron, or other hard foreign substance, not infrequently causes damage and annoyance to the machinery.

An object of my invention is to provide an improved means for catching the stones or other foreign matter, and to so arrange the device that the stones, etc., may be cleaned from the flume without interfering with the flow of the beets for any material period of time.

The distinguishing features of my invention and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a plan view of my improved device interposed in a flume; Fig. 2 is a longitudinal vertical section on about the line 2—2 of Fig. 1; Fig. 3 is a cross section on about the line 3—3 of Fig. 2; and Fig. 4 is a fragmentary end view showing the dog for holding the device in position.

In the illustrated practical embodiment of my invention, a flume section is constructed comprising a concave pocket 10, the ends 11 of which have openings 12 that receive end portions 13 of the flume, the ends 11 desirably having flanges 14 on which the flume sections 13 rest. Any suitable bottom support 15 may be provided for the concave pocket 10. The ends 11 may be formed with bearings 16 that receive the trunnions 17, 18, which may consist of projecting ends of a shaft 19 on which are mounted elements forming conduits and sweeps or flume-clearing members. Thus conduits 20 are disposed advantageously at diametrically opposite sides of the shaft 19, and sweep or flume-clearing blades 21 are provided, and alternate with the conduits 20 around the shaft. The blades 21 may be integral with each other and consist of plates 22 spaced at the center by blocks 23 and secured to the shaft 19, as by bolts 24, that pass through the plates 22 on opposite sides of the shaft and through the intermediate blades 23 and through the shaft 19. The conduits 20 may consist, as illustrated, of a plate bent into arched form, the inner ends of the plate being flanged, as at 26, and riveted, as at 27, to the plates 22. Desirably the meeting ends of the respective blades 21 are riveted to each other at the outer edges, as at 28. On one trunnion 18 is mounted a collar 29 having teeth 30 for the application of a lever or other tool, to rock or turn the shaft 19. Each conduit 20 is formed with outlets 31 in the bottom thereof for the escape of stones or other hard substances, and at each outlet deflecting plates 32 are provided and inclined inwardly, the said plates extending partially over the opening. The necessity for the deflecting plates and their inclination will depend on the rapidity of the flow of the water passing through the flume sections 13. If the flow is not rapid, then the deflecting plates 32 cause the beets to ride upward so as to be carried by the stream beyond the outlet 31. On the other hand, if the flow of the stream is very rapid, the beets will move over the outlet so rapidly as not to drop therethrough. Stones, however, that move more slowly and roll over the bottom of the conduit in contact therewith, will drop through the outlet 31. Additional deflecting plates 33 may be provided, projecting outwardly at the outlets 31, at the end opposite the deflecting plates 32 to direct the stones downward into the pocket 10 to the bottom thereof. The arrangement is such that the bottom of the conduit will be substantially in line with the flume sections 13 and spaced a sufficient distance above the bottom of the pocket 10 to provide the necessary space for the collection of stones, etc.

When the shaft is rocked or turned the conduit section in the pocket will be moved transversely of the flume, while the conduit that was uppermost will be moved into position in line with the flume sections, so that the pocket that was previously in action may be cleaned, while the other conduit is in position. Thus the flow of the beets need not be interrupted while the conduit is being cleaned. The rocking of the shaft also, it will be seen, swings the clearing blade 21 downward and transversely of the flume so that the stones and other matter in the pocket 10 will be raised upward, the said blades having a length greater than the conduits 20, and moved in a path close to the wall of the pocket 10. The blades 21 serve to carry the stones, etc., upward to one side of the pocket, from which the stones are thrown onto a grating 35, provided adjacent to the flume, the grating being usually arranged over a sewer, or the like.

The collar 29 is formed with recesses 29ª for receiving a locking dog or catch 40, which may be pivoted, as at 41, to the end 11 of the pocket, the said dog having a tooth 42 on its under side to engage between the teeth 29ª, for holding the shaft 19 and the elements carried thereby in position.

By the operation of the device, any beets that may escape with the stones are recovered when the stones are dumped upon the grating, and are therefore not lost, as with present arrangements. Moreover, the stones escaping from the flume will not clog the drain. A further advantage is that there is no waste water, as with stone catches and drains as usually provided. One half turn of the shaft serves to clear the pocket of stones and to bring a new conduit section into position.

Having thus described my invention, I claim as new and desire to secure by Letters Patent:

1. A flume, having a section provided with conduits at an angle to each other, the section being movable relatively to the flume to bring either of said conduits into line with the flume.

2. A flume having a section comprising a pocket, and conduits mounted above the pocket, the said section being movable relatively to the flume to bring either conduit into line with the flume.

3. A flume section having a plurality of conduits, and means for rockably mounting said section.

4. A rockable flume section having conduits disposed approximately at diametrically opposite points on said section.

5. A flume section having a conduit, a flume-cleaning member, and means for movably mounting said section in a flume.

6. A flume section having a conduit, a flume-cleaning member, and means for movably mounting said section in a flume, said conduit and cleaning member being at an angle to each other.

7. The combination with a flume of a section having a pocket, and a clearing member movable transversely of the pocket over the surface thereof.

8. The combination with a flume of a section having a concave pocket, and a clearing member rockably mounted above the said pocket, to rock transversely of the direction of length of the flume section.

9. A flume section comprising a concave pocket and rockable means above said pocket, said means comprising a conduit section formed with an outlet for stones and the like in the bottom thereof, and a clearing member of greater radius than the conduit section, and rockable therewith transversely of the pocket.

10. A rockable flume section having conduits at approximately opposite points, and intermediate flume-clearing members, the section being movable to bring either conduit or either clearing member into operation.

11. A rockable flume section having an outlet at the bottom for the escape of stones.

12. A rockable flume section having an outlet at the bottom for the escape of stones, said outlet having a deflecting plate at said outlet and extending at an angle within the conduit.

13. A rockable flume section having an outlet at the bottom for the escape of stone, and a deflector at said outlet on the exterior.

14. The combination with a flume of a section mounted to move transversely of the flume and formed of a conduit having an outlet at the bottom for the escape of stone.

15. A flume section having a conduit open at both ends, an outlet for stones in the bottom, said section having a pocket below the conduit, said conduit being rockable in said pocket.

In testimony whereof, I have signed my name to this specification in the presence of two subscribing witnesses.

HENRY R. VAN EYCK.

Witnesses:
WM. O. VAN EYCK,
A. F. SLOTER.